(12) United States Patent
Sher

(10) Patent No.: US 8,058,999 B2
(45) Date of Patent: Nov. 15, 2011

(54) READER WITH RADIO FREQUENCY IDENTIFICATION FUNCTION

(75) Inventor: Shang-Fang Sher, Hsin-Tien (TW)

(73) Assignee: Unitech Electronics Co., Ltd., Taipei (TW)

( * ) Notice: Subject to any disclaimer, the term of this patent is extended or adjusted under 35 U.S.C. 154(b) by 272 days.

(21) Appl. No.: 12/112,350

(22) Filed: Apr. 30, 2008

(65) Prior Publication Data

US 2009/0273445 A1    Nov. 5, 2009

(51) Int. Cl.
*G08B 13/14* (2006.01)
(52) U.S. Cl. .............. 340/572.8; 340/539.1; 340/539.11
(58) Field of Classification Search ................ 340/572.8
See application file for complete search history.

(56) References Cited

U.S. PATENT DOCUMENTS

| | | | |
|---|---|---|---|
| 6,158,661 A * | 12/2000 | Chadima et al. | 235/472.01 |
| 6,584,301 B1 * | 6/2003 | Bohn et al. | 455/41.1 |
| 6,895,419 B1 * | 5/2005 | Cargin et al. | 708/131 |
| 7,398,072 B2 * | 7/2008 | Corrigan et al. | 455/301 |
| 2004/0108377 A1 * | 6/2004 | Rietveld | 235/380 |
| 2004/0260646 A1 * | 12/2004 | Berardi et al. | 705/39 |
| 2005/0156040 A1 * | 7/2005 | Young et al. | 235/439 |
| 2007/0096909 A1 * | 5/2007 | Lally | 340/572.1 |
| 2007/0247318 A1 * | 10/2007 | Pempsell et al. | 340/572.8 |
| 2008/0180215 A1 * | 7/2008 | Mott | 340/10.1 |

* cited by examiner

*Primary Examiner* — Jennifer Mehmood
*Assistant Examiner* — Naomi Small
(74) *Attorney, Agent, or Firm* — Chun-Ming Shih; HDLS IPR Services

(57) ABSTRACT

A reader with a radio frequency identification function for reading a signal of an electronic tag includes a casing, a first circuit board, a second circuit board and a transmission interface. The casing in a racket shape is composed of an upper casing and a lower casing. Each of the upper and lower casings has a large-area receiving portion with a surface in a racket shape. The first circuit board is installed in the large-area receiving portion and can be designed with a large area of RFID antenna pattern. The second circuit board can be installed on the radio frequency identification (RFID) circuit. After the antenna of the first circuit board receives a signal from the electronic tag, the signal is processed and stored by the second circuit board or transmitted to an external computer through a transmission interface installed on the casing.

7 Claims, 4 Drawing Sheets

READER WITH RADIO FREQUENCY IDENTIFICATION FUNCTION

BACKGROUND OF THE INVENTION

1. Field of the Invention

The present invention generally relates to a reader, and more particularly to a radio frequency identification (RFID) reader.

2. Description of Prior Art

In recent years, electronic tag becomes a mainstream development of automatic identification technology to overcome the drawbacks of bar codes. Manufacturers spare no effort to find a better solution, and thus the radio frequency identification (RFID) technology and "electronic tag" are introduced.

RFID is a non-contact automatic identification technology for identifying a target object and obtaining related data through a radio frequency signal. The identification work requires no manual operation, and thus RFID is considered as a version of wireless bar code. In addition, the RFID technology has more advantages including water resistance, magnetism resistance, high temperature resistance, long life, large reading distance, encrypted data in the tag, large data storage capacity, and flexible information update than traditional bar codes, and the applications of RFID will bring a revolutionary change to the business model of stores and the purchasing behavior of consumers.

Since electronic tags are used extensively in the area of managing books, products or tools, users simply hold a reader to read a signal transmitted from the electronic tag attached on the book, product or tool to find out the location of the book, product or tool. The transmission power of the electronic tag is small, and thus the reader cannot read the signal from the electronic tag if the electronic tag is attached to a different position of the book, product or tool, or the electronic tag is situated at a high position. As a result, users may not be able to find the required book, product or tool easily, and it thus causes tremendous inconvenience to users.

SUMMARY OF THE INVENTION

It is a primary objective of the present invention to overcome the foregoing shortcomings by providing a RFID reader that increases the area of an antenna for receiving signals from the electronic tag and extends the receiving range of the reader. If a book, product or tool with an electronic tag is placed at a high position, or the electronic tag is attached at a different position of the book, product or tool, the reader can still receive the signal transmitted from the electronic tag, so that users can manage or find the desired item easily.

To achieve the foregoing objective, the present invention provides a reader with a radio frequency identification function, and the reader comprises a casing, a first circuit board, a second circuit board and a transmission interface. The casing is substantially in a racket shape and composed of an upper casing and a lower casing, and each of the upper and lower casings has a large-area receiving portion with a surface substantially in a racket shape. The first circuit board is installed in the large-area receiving portion, and the first circuit board can be designed with a large RFID antenna pattern. The second circuit board can be installed onto the radio frequency identification (RFID) circuit. After the antenna of the first circuit board receives a signal from the electronic tag, the signal is processed and stored by the second circuit board or transmitted to an external computer through a transmission interface installed on the casing.

DETAILED DESCRIPTION OF THE INVENTION

The technical characteristics, features and advantages of the present invention will become apparent in the following detailed description of preferred embodiments with reference to the accompanying drawings.

Figure 1:
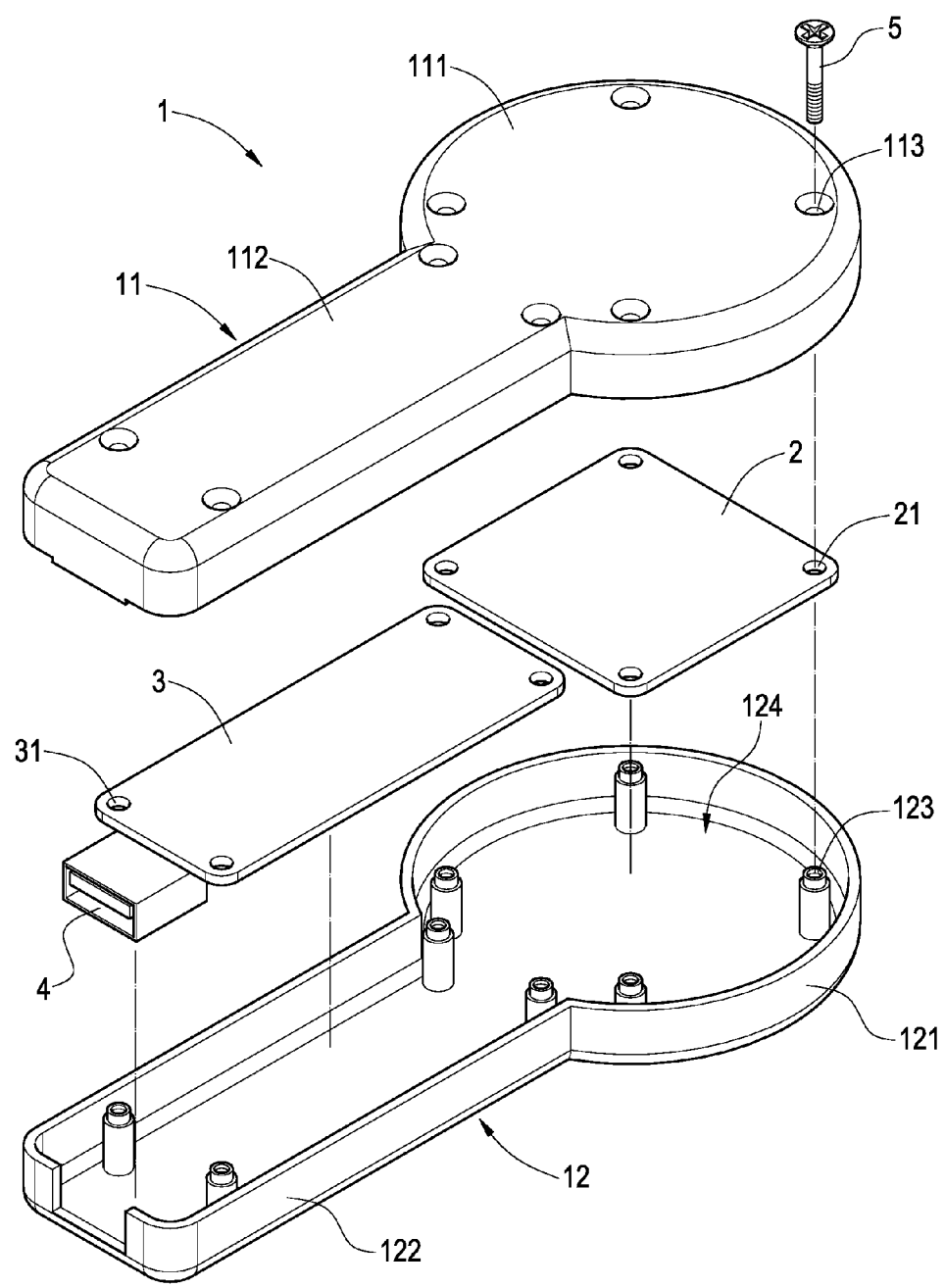
FIG. 1 is an exploded view of a reader of the present invention.
Figure 2:
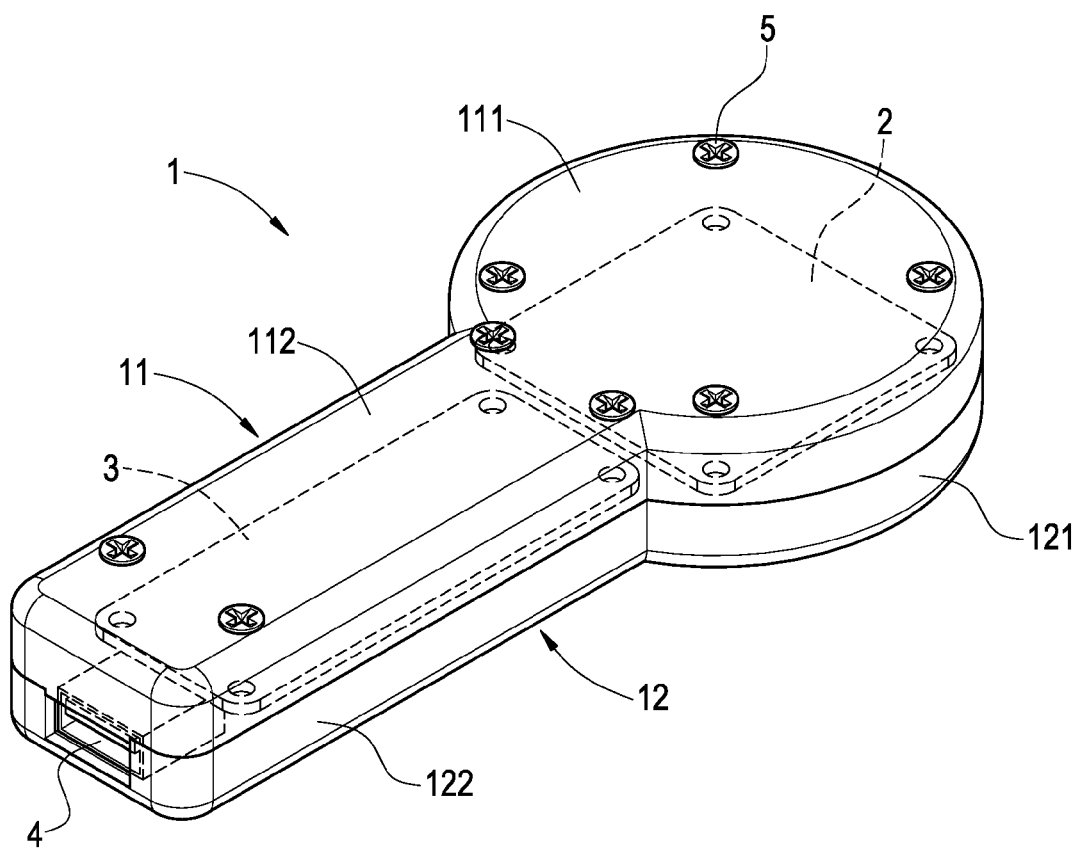
FIG. 2 is a perspective view of a reader of the present invention.

Referring to FIGS. 1 and 2 for an exploded view and a perspective view of a reader of the present invention respectively, the reader with a radio frequency identification function comprises a casing 1, a first circuit board 2, a second circuit board 3 and a transmission interface 4.

The casing 1 is substantially in a racket shape, and composed of an upper casing 11 and a lower casing 12, and the upper casing 11 has a large-area receiving portion 111 and a handle portion 112 extended from the large-area receiving portion 111. A plurality of holes 113 are disposed on surfaces of the large-area receiving portion 111 of the upper casing 11 and the handle portion 112 and penetrated through the upper casing 11. The lower casing 12 includes a large-area receiving portion 121 and a handle portion 122 extended from the large-area receiving portion 121. A plurality of fixing pillars 123 are disposed in a containing space 124 inside the large-area receiving portion 121 and the handle portion 122 of the lower casing 12. In the figure, the large-area receiving portion 111, 121 can be in a circular shape or a square shape.

The first circuit board 2 is a square circuit board, having a through hole 21 disposed separately on the four corners of the first circuit board 2 and corresponding to fixing pillars 123 in the large-area receiving portion 121 of the lower casing 12. When screws 5 are passed through the holes 113 on the surface of the large-area receiving portion 111 of the upper casing 11 respectively and passed through the through holes 21 and the fixing pillars 123, the first circuit board 2 is fixed inside the casing 1.

The second circuit board 3 electrically coupled to the first circuit board 2 is a square circuit board with through holes 31 disposed respectively at four corners of the second circuit board 3 and corresponding to the fixing pillars 123 in the handle portion 122 of the lower casing 12. After screws 5 are passed through the holes 113 on the surface of the handle portion 112 of the upper casing 11 and then through the through holes 31 and the fixing pillars 123 respectively, the second circuit board 3 is fixed in the casing 1.

The transmission interface 4 is electrically coupled to the first circuit board 2 or the second circuit board 3, and exposed to the outside from the bottom of the handle portion 112, 122 fixed to the upper casing 11 and the lower casing. The transmission interface 4 is a wireless transmitter (Bluetooth), a connector (SATA, USB or Micro USB) or a cable. If the connector is a SATA or USB connector, the connector can be used for connecting a flash stick, an external hard disk, or an external cable connected to a computer.

Figure 3:
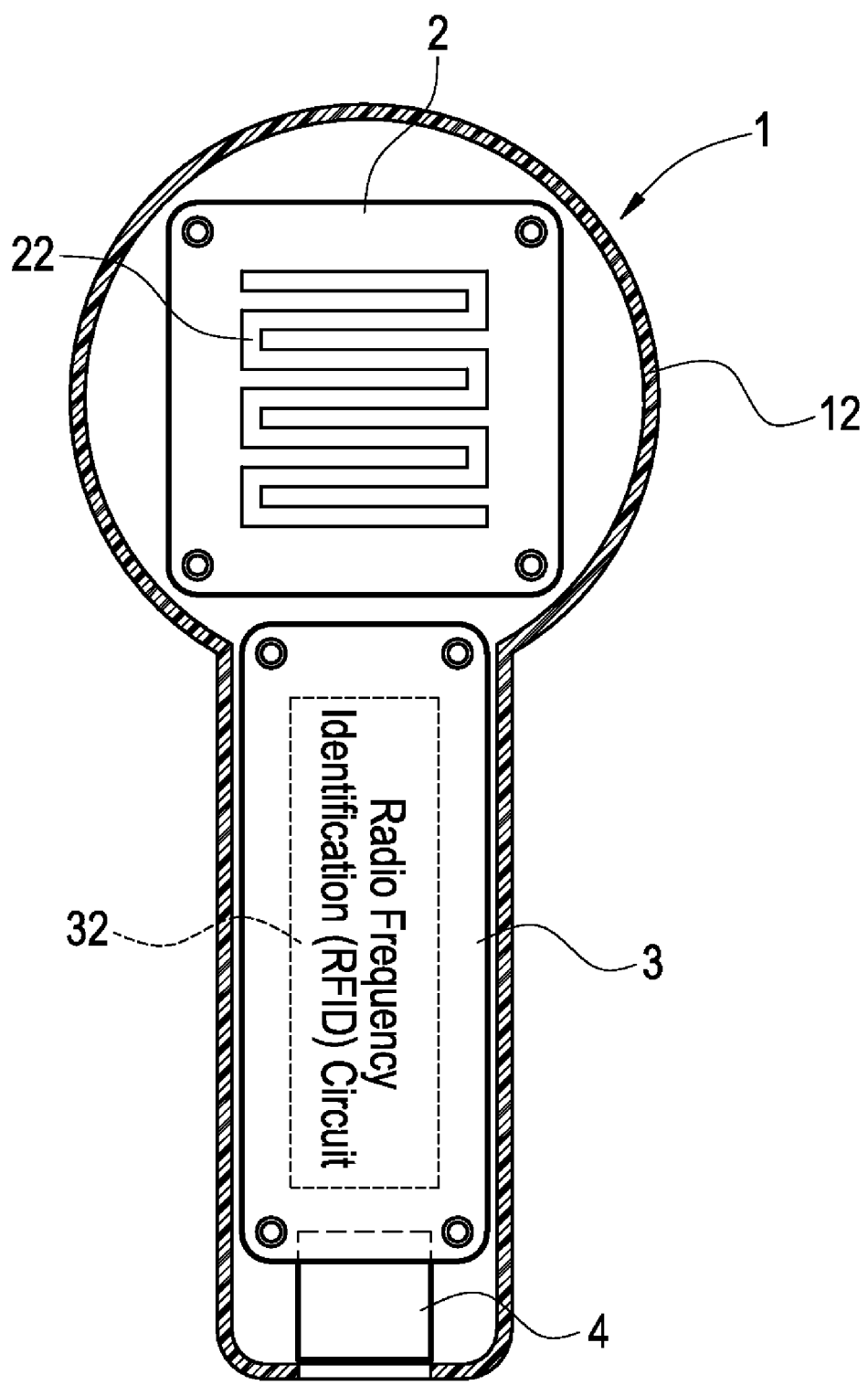
FIG. 3 is a schematic view of an application of the present invention.

Referring to FIG. 3 for a schematic view of an application of the present invention, a reader is adopted in the invention. Since the internal space and area of the large-area receiving portion 111, 121 of the upper and lower casings 11, 12 of the casing 1 are large, the pattern area of the antenna 22 installed on the first circuit board 2 and used by radio frequency identification (RFID) circuit 32 can be increased for extending the receiving range of the antenna 22.

The radio frequency identification (RFID) circuit 32 includes circuits of a radio frequency module, a microprocessor and a memory installed on the second circuit board 3, and the second circuit board 3 is electrically coupled to the transmission interface 4. Since the radio frequency identification (RFID) circuit is a prior art, the RFID circuit will not be described here.

If a user uses the reader for checking inventory or searching for a book or a product, the user simply holds the handle portion 112, 122 of the casing 1 of the reader to scan the desired book or product in a storage area or at a high position, and the signal from the electronic tag can be received through the antenna 22 of the first circuit board. The user can also insert the reader in the gaps among the books or products to read the signal transmitted from the electronic tag attached on the desired book or product. This application makes the inventory of books or products much easier for the users.

After the antenna 22 of the first circuit board 2 of the reader receives the signal from the electronic tag, the signal is transmitted to the second circuit board 3, processed by the microprocessor, and stored in the memory. The read signal is transmitted to a rear-end computer through the transmission interface 4 after the inventory of books or products is completed, and thus the location of the desired book or product can be found directly from the read signals transmitted to the rear-end computer.

Figure 4:
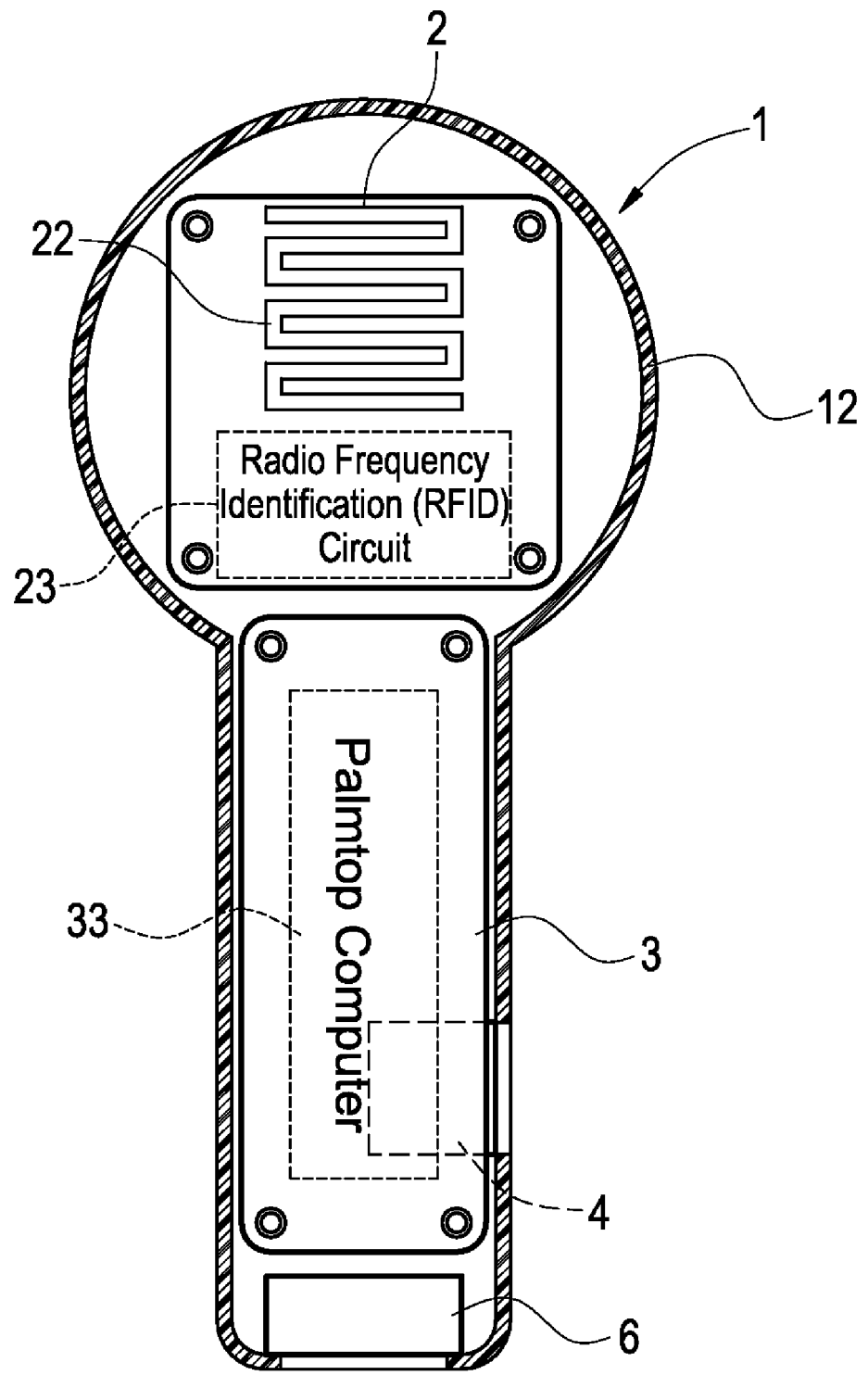
FIG. 4 is a schematic view of another application of the present invention.

Referring to FIG. 4 for a schematic view of another application of the present invention, the reader with a radio frequency identification (RFID) circuit is integrated with a palmtop computer (or a bar code scanner) 33. The radio frequency identification (RFID) circuit 23 and the antenna 22 can be installed on the first circuit board 2, so that the area of the antenna pattern can be increased and the receiving range of the antenna can be extended. The circuit of the bar code scanner is designed on the second circuit board 3, and a pickup head 6 for reading a bar code can be added on the casing 1.

During use, the RFID circuit on the first circuit board 2 receives a signal transmitted from an electronic tag attached on an object, and the RFID circuit processes and stores the signal, and then transmits the signal of the electronic tag read by the first circuit board 2 to an external computer through the transmission interface 4.

Users can also use a pickup head 6 to read the bar code of the book or product, and the bar code is processed by the second circuit board 3 and stored into the memory of the bar code scanner. After the desired book or product is found, the read or scanned signal of the book or product is transmitted to an external computer through the transmission interface 4.

Further, a display screen can be installed on the casing 1 as described in the foregoing two preferred embodiments, such that when a user reads an electronic tag or scans a bar code of a book or product, the user can know the quantity of the items.

While the invention is described in by way of examples and in terms of preferred embodiments, it is to be understood that the invention is not limited thereto. On the contrary, the aim is to cover all modifications, alternatives and equivalents falling within the spirit and scope of the invention as defined by the appended claims.

What is claimed is:

1. A reader with a radio frequency identification function, for increasing an area of an antenna to receive an electronic tag signal, and the reader comprising:
    a casing, composed of an upper and a lower casings, and each of the upper and the lower casings having a large-area receiving portion and a handle portion extended from the large-area receiving portion, wherein the large-area receiving portion and the handle portion are integrally made and the large-area receiving portion has a width larger than a width of the handle;
    a first circuit board, installed in the casing and within the large-area receiving portion so that merely the first circuit board occupies in the large-area receiving portion, wherein the first circuit board solely includes an antenna pattern for receiving signal only; and
    a second circuit board, installed in the casing and within the handle portion, and in the same plane and electrically coupled with the first circuit board, wherein the second circuit board includes a radio frequency identification (RFID) unit.

2. The reader with a radio frequency identification function of claim 1, wherein the casing large-area receiving portion is in a circular shape or a square shape.

3. The reader with a radio frequency identification function of claim 1, further comprising a plurality of holes disposed on surfaces of the large-area receiving portion and the handle portion of the upper casing and penetrated through the upper casing.

4. The reader with a radio frequency identification function of claim 1, wherein the large-area receiving portion and the handle portion of the lower casing include a containing space for installing a plurality of fixing pillars.

5. The reader with a radio frequency identification function of claim 1, further comprising a transmission interface installed in the casing to be electrically coupled to the second circuit board and exposed to outside from a bottom of the handle portion.

6. The reader with a radio frequency identification function of claim 5, wherein the transmission interface is a connector, a wireless transmitter or an electric cable.

7. The reader with a radio frequency identification function of claim 6, wherein the connector is a SATA, USB or Micro USB connector.

* * * * *